United States Patent
Takagi et al.

(10) Patent No.: US 6,797,225 B2
(45) Date of Patent: Sep. 28, 2004

(54) PROCESS FOR PRODUCING POLYESTER SHEET AND FILM

(75) Inventors: Norio Takagi, Zama (JP); Shozo Nitta, Sagamihara (JP); Yo Goto, Sagamihara (JP)

(73) Assignee: Teijin Limited, Osaka (JP)

( * ) Notice: Subject to any disclaimer, the term of this patent is extended or adjusted under 35 U.S.C. 154(b) by 365 days.

(21) Appl. No.: 10/069,075

(22) PCT Filed: Jun. 21, 2001

(86) PCT No.: PCT/JP01/05310

§ 371 (c)(1),
(2), (4) Date: Feb. 21, 2002

(87) PCT Pub. No.: WO01/98058

PCT Pub. Date: Dec. 27, 2001

(65) Prior Publication Data

US 2002/0158369 A1 Oct. 31, 2002

(30) Foreign Application Priority Data

| Jun. 23, 2000 | (JP) | ................................. 2000-189249 |
| Jun. 23, 2000 | (JP) | ................................. 2000-189250 |
| Jul. 13, 2000 | (JP) | ................................. 2000-212599 |
| Jul. 13, 2000 | (JP) | ................................. 2000-212600 |
| Aug. 31, 2000 | (JP) | ................................. 2000-262534 |

(51) Int. Cl.$^7$ .......................... B29C 41/26; B29C 47/88
(52) U.S. Cl. ................. 264/466; 264/210.5; 264/210.7; 264/216; 264/290.2; 264/484
(58) Field of Search .......................... 264/466, 484, 264/216, 217, 210.5, 210.7, 288.4, 288.8, 290.2; 425/66, 174, 174.4, 224

(56) References Cited

U.S. PATENT DOCUMENTS

| 4,478,772 | A |   | 10/1984 | Takagi et al. |
| 4,519,757 | A |   | 5/1985 | Wittkopf et al. |
| 4,604,453 | A |   | 8/1986 | Kuze et al. |
| 5,654,394 | A |   | 8/1997 | Miyakawa et al. |
| 6,221,301 | B1 | * | 4/2001 | Tsunashima et al. ........ 264/466 |

FOREIGN PATENT DOCUMENTS

| EP | 0 372 829 A2 | 6/1990 |
| EP | 0 676 269 A2 | 10/1995 |
| EP | 0 943 414 A1 | 9/1999 |
| JP | 47-3917 | 2/1972 |
| JP | 48-4465 | 2/1973 |
| JP | 54-8672 | 1/1979 |
| JP | 57-51426 A | 3/1982 |
| JP | 62-189133 A | 8/1987 |
| JP | 62-196118 A | 8/1987 |
| JP | 3-65775 B2 | 10/1991 |
| JP | 5-177702 A | 7/1993 |
| JP | 6-118558 A | 4/1994 |
| JP | 10-217307 A | 8/1998 |
| JP | 2000-127221 A | 5/2000 |

OTHER PUBLICATIONS

International Search Report.

* cited by examiner

Primary Examiner—Mathieu D. Vargot
(74) Attorney, Agent, or Firm—Sughrue Mion, PLLC

(57) ABSTRACT

A process for producing a polyester sheet by dropping a molten polyester sheet extruded from an orifice-form nozzle on a cooling roll having the grooves of a large number of micro-cracks formed on the surface, closely adhering it to the cooling roll and solidifying it on the cooling roll, wherein the surface temperature (T, ° C.) of the molten polyester sheet 10 mm below the orifice-form nozzle is maintained at a temperature which satisfies the following expression (1):

$$(Tc+20)° C. \leq T \leq (Tm+40)° C. \quad (1)$$

wherein Tc and Tm are the falling temperature crystallization temperature (° C.) and melting point (° C.) of the polyester, respectively and T is as defined hereinabove, and the surface temperature of the cooling roll when it contacts the molten polyester sheet is controlled to a range of 5 to 100° C. to continuously form the polyester sheet while preventing the adhesion of a sublimate from the molten polyester to the inside of the groove of each micro-crack of the cooling roll.

14 Claims, 1 Drawing Sheet

PROCESS FOR PRODUCING POLYESTER SHEET AND FILM

FIELD OF THE INVENTION

The present invention relates to polyester sheet and film production processes. More specifically, it relates to a polyester sheet production process which can suppress the adhesion of a low-molecular weight sublimate to the inside of a micro-crack when a polyester sheet is extrusion molded using a cooling roll having micro-cracks formed on the surface and which is capable of producing a high-quality sheet having excellent smoothness stably at a high speed for a long time and to a process for producing a biaxially oriented polyester film from the obtained sheet.

PRIOR ART

As means of casting a polymer sheet, there has been known a method in which a sheet product of a molten polymer extruded from an orifice-form nozzle is closely adhered to the surface of a cooling roll to be solidified by an electrostatic adhesion method or gas pressure method. A cooling roll having a smooth surface (mirror finished surface) is generally used as the cooling roll in this method, and air caught in a gap between the cooling roll surface and the sheet product must be removed when the sheet product of the molten polymer is closely adhered to the surface of the cooling roll.

The removal of the caught air becomes more difficult as the casting speed increases, thereby causing various problems. For instance, since the caught air is existent in the form of a bubble in the electrostatic adhesion method, it causes a sheet surface defect, resulting in deterioration in the smoothness of the sheet. In the gas pressure method, the caught air causes insufficient heat transmission between the sheet and the cooling roll with the result that the sheet is not cooled enough. When the sheet is not cooled enough, the sublimation of a low-molecular weight compound contained in the molten polyester continues whereby the accumulation of the low-molecular weight compound on the surface of the cooling roll becomes marked and the compound is transferred to the surface of the sheet, thereby causing an orange skin-like defect.

When the amount of the low-molecular weight compound accumulated on the surface of the cooling roll increases, insufficient heat transmission becomes more marked, thereby making high-speed casting impossible.

This problem can be improved by exchanging the cooling roll proposed by JP-A 62-196118 (the term "JP-A" as used herein means an "unexamined published Japanese patent application") for a cooling roll having a micro-crack formed surface (micro-cracked surface). That is, since the caught air is scattered through the grooves of the micro-cracks in the electrostatic adhesion method, a bubble-form defect can be improved and the casting speed can be greatly increased. Since the caught air is also scattered through the grooves of the micro-cracks in the gas pressure method, a reduction in the heat transmission speed between the sheet and the cooling roll can be prevented and the occurrence of an orange skin-like defect can also be avoided.

However, a process for extrusion molding a polyester sheet using a cooling roll having a micro-cracked surface involves a new problem that the ventilation resistance of the micro-crack increases along the passage of time, thereby reducing the function of scattering the caught air through the grooves of the micro-crack in a short period of time. The cause of this is that a low-molecular weight compound sublimated from a sheet product is accumulated in the inside of the groove of the micro-crack, thereby clogging the groove. Therefore, the low-molecular weight compound must be removed frequently from the groove, which poses a production problem.

To remove the deposit accumulated on the surface of the cooling roll, there are known (1) a method in which a non-contact portion between the surface of a cooling roll and a polyester sheet is always cleaned by water or a solvent, and the water or solvent is dried and sucked to be removed as disclosed by JP-B 47-3917 and JP-B 48-4465 (the term "JP-B" as used herein means an "examined Japanese patent publication"), (2) a method in which the surface of a cooling roll is subjected to a corona treatment as disclosed by JP-A 57-51426 and (3) a method in which a deposit is decomposed and removed by irradiating the surface of a cooling roll with ultraviolet radiation as disclosed by JP-B 3-65775.

However, the above method (1) is effective for a cooling roll having a mirror finished surface but cannot be applied to a cooling roll having a micro-cracked surface because it is difficult to wash the inside of the groove and remove a liquid in the inside of the groove. The methods (2) and (3) are also effective for a cooling roll having a mirror finished surface but cannot be applied to a cooling roll having a micro-cracked surface because they have a poor effect of decomposing and removing the deposit in the inside of the groove.

In order to wash the inside of the groove of each micro-crack of the cooling roll, JP-A 10-217307 discloses a method in which the cooling roll is immersed in a chemical bath. However, this method involves problems to be solved for practical application, such as the interruption of sheet production and the complicated operation of immersing the cooling roll in a chemical bath.

Other solutions to the above problems include a method in which the width of groove of the micro-crack is increased. However, when the width of the groove is increased, new problems are expected to arise that the transfer of the micro-crack to the sheet may cause an orange skin-like defect and it is extremely difficult to form micro-cracks having a larger width uniformly on the surface of the cooling roll.

SUMMARY OF THE INVENTION

It is an object of the present invention to provide a polyester sheet production process which can reduce the frequency of interrupting sheet production by cooling a polyester sheet while the increase speed of ventilation resistance caused by the clogging of the groove of each micro-crack is controlled to a low level and which eliminates the need for bulky equipment.

It is another object of the present invention to provide a polyester sheet production process which can provide a high-quality film without transfer by using a cooling roll having the grooves of micro-cracks.

It is still another object of the present invention to provide a process for producing a biaxially oriented polyester film from a polyester sheet produced by the above process of the present invention.

Other objects and advantages of the present invention will become apparent from the following description.

According to the present invention, firstly, the above objects and advantages of the present invention are attained by a process for producing a polyester sheet by dropping a molten polyester sheet extruded from an orifice-form nozzle on a cooling roll having the grooves of a large number of micro-cracks formed on the surface, closely adhering it to the cooling roll and solidifying it on the cooling roll, wherein the surface temperature (T, ° C.) of the molten polyester sheet 10 mm below the orifice-form nozzle is maintained at a temperature which satisfies the following expression (1):

$$(Tc+20)° C. \leq T \leq (Tm+40)° C. \quad (1)$$

wherein Tc and Tm are the falling temperature crystallization temperature (° C.) and melting point (° C.) of the polyester, respectively and T is as defined hereinabove, and the surface temperature of the cooling roll when it contacts the molten polyester sheet is controlled to a range of 5 to (Tg−20)° C. (Tg is the glass transition temperature of the polyester) to continuously form the polyester sheet while preventing the adhesion of a sublimate from the molten polyester to the inside of the groove of each micro-crack of the cooling roll.

According to the present invention, secondly, the above objects and advantages of the present invention are attained by a process for producing a biaxially oriented polyester film, comprising the step of biaxially orienting the polyester sheet obtained by the above process of the preset invention in a longitudinal direction and a transverse direction.

THE PREFERRED EMBODIMENTS OF THE INVENTION

Figure 1:
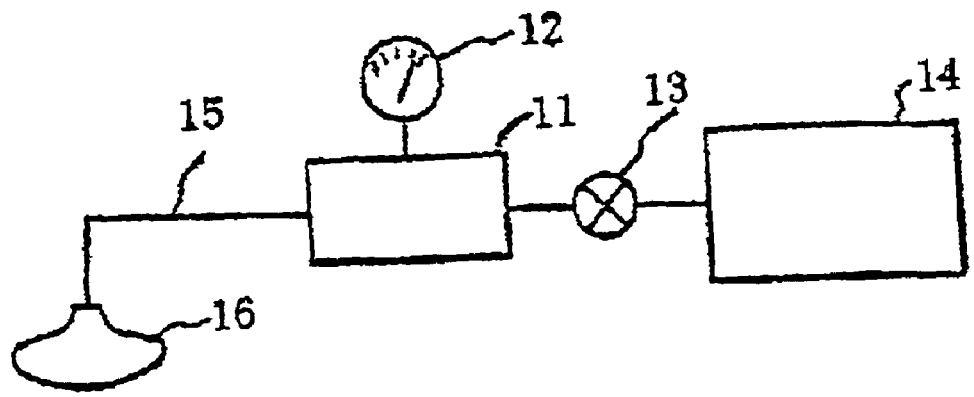
FIG. 1 is a diagram of an instrument for measuring the ventilation resistance of the groove of each micro-crack of a cooling roll.

The polyester sheet production process of the present invention will be first described hereinbelow.

In the present invention, a cooling roll having the grooves of a large number of micro-cracks formed on the surface is used as the cooling roll. That is, a large number of fine and irregular grooves are existent on the flat surface of the cooling roll and form micro-cracks from the surface to a deep portion.

The grooves of the micro-cracks which are formed irregularly as described above have a ventilation resistance measured by a vacuum leakage method to be descried hereinafter of preferably 10,000 sec or less, more preferably 5,000 sec or less, particularly preferably 1,000 sec or less. The most preferred ventilation resistance is in the range of 2 to 500 sec. When the ventilation resistance exceeds 10,000 sec, the improvement of the casting speed is hardly expected.

The ventilation resistance in the present invention is represented by a time required for a reduction in the degree of vacuum from a certain value to another certain value when a vacuum region is formed in the surface of the cooling roll, air flows into the region through the grooves of the micro-cracks on the surface of the cooling roll and this vacuum suction is stopped. As for a specific method of measuring ventilation resistance, as shown in the schematic diagram of FIG. 1, a vacuum pump 14 is connected to one end of a vessel 11 equipped with a vacuum gauge 12 through a vacuum cock 13 and a rubber sucker 16 (for example, FPM. PFYK-40 of Myotoku Co., Ltd.) is attached to the other end by a vacuum hose 15. The effective volume from the vacuum cock 13 to the sucker 16 is 100 cc. As shown in the enlarged sectional view of the sucker portion of FIG. 2, a 40 mm-diameter sucker (16, 22) is pressed against the surface 24 of the cooling roll and a 30 mm-diameter porous sheet (8-L-500 Naslon low-density sintered material of Nippon Seisen Co., Ltd.) 23 is placed and pressed against the center of the sucker so that it contacts the outer surface of the sucker. When the inside of the 100 cc vessel is evacuated to −93.1 kPa (−700 mmHg) or less by the vacuum pump 14 and the cock 13 is closed, air flows into the vacuum system through the grooves of the surface surrounded by the sucker, resulting in a reduction in the degree of vacuum. The time required for a reduction in the degree of vacuum from −93.1 kPa to −86.45 kPa (−700 mmHg to −650 mmHg) is defined as ventilation resistance. Before the measurement of ventilation resistance, it is confirmed that the ventilation resistance of a polished glass plate is 20,000 sec or more to check the vacuum leakage of the measuring instrument.

Preferably, the cooling roll has the grooves of at least five micro-cracks intersecting a 10 mm long virtual straight line drawn on the surface of the cooling roll in any direction, 70% or more of the grooves of the intersecting micro-cracks have a width of 0.1 to 100 μm at intersections with the virtual straight line, and the total width of all the grooves of the micro-cracks intersecting the virtual straight line at the intersections is 5 mm or less. When the molten sheet is closely adhered to the surface of the cooling roll, air caught between them is exhausted through the grooves of the micro-cracks.

Since the transfer intensity of the grooves of the micro-cracks to the sheet (orange skin-like defect) depends on the width of the groove of each micro-crack, the width of the groove is preferably set to 100 μm or less, more preferably 50 μm or less, particularly desirably 20 μm or less to weaken the transfer intensity.

Further, the total opening area of the grooves of a large number of micro-cracks open to the surface of the cooling roll is preferably 0.01 to 0.3 mm$^2$ per 1 mm$^2$ of the surface of the cooling roll.

When this value is smaller than 0.01 mm$^2$, it is difficult to increase the casting speed to the full and when the value is larger than 0.3 mm$^2$, it is difficult to release the polyester sheet solidified on the cooling roll from the cooling roll at the time of casting.

The lower limit value is preferably 0.02 mm$^2$ to increase the casting speed and the upper limit value is preferably 0.2 mm$^2$ to release the polyester sheet from the cooling roll smoothly.

The total opening area of the grooves may be obtained by measuring at least 1 mm$^2$ portion of the surface in contact with the molten polyester sheet of the cooling roll. However, it is preferably obtained by measuring at least four locations of the surface in contact with the molten polyester sheet of the cooling roll (4 locations crossing one another at an angle of 90° in a circumferential direction of a center portion in the width direction of the cooling roll) and averaging the measurement values, particularly preferably by measuring 12 locations (12 locations crossing one another at an angle of 90° in a circumferential direction of a center portion in the width direction of the cooling roll and intermediate portions between both end portions and the center portion) and averaging the measurement values.

In the process of the present invention, the molten polyester sheet extruded from the orifice-form nozzle is dropped on the surface of the above cooling roll, closely adhered to the cooling roll and further solidified on the cooling roll.

The orifice-form nozzle is a nozzle having a linear opening, such as a T die, fish-tail die or I die. A nozzle incorporating a pipe in parallel to an orifice in a width direction at the end of the nozzle is advantageous.

As means of closely adhering the molten polyester sheet to the surface of the cooling roll, preferred are, for example, an electrostatic adhesion method in which a molten polyester sheet is closely adhered to the surface of a cooling roll with Coulomb force by applying electrostatic charge to the sheet and a gas pressure method in which a molten polyester sheet is closely adhered to the surface of a cooling roll by applying the static pressure of gas essentially composed of air to the sheet.

Various methods of cooling the cooling roll may be employed.

A cooling roll for cooling a polyester sheet on the surface thereof by introducing cooling water therein and discharging it is preferred. In this case, it is preferred to control the temperature of the cooling water to be discharged to a temperature 1 to 10° C. higher than the temperature of the cooling water to be introduced. When the temperature rise is more than 10° C., the cooling capacity of the cooling roll decreases, thereby increasing the temperature of the sheet in the cooling step and the amount of a low molecular weight compound sublimated from the sheet product and making it difficult to release the sheet from the cooling roll as the sheet product sticks to the cooling roll with the result that the molding speed of the sheet must be reduced. In addition, the quality of the obtained sheet varies in the width direction due to a temperature difference in the width direction of the cooling roll.

To reduce the temperature rise to 1° C. or less, the amount of cooling water to be introduced into the cooling roll must be made larger than required, thereby increasing the size of equipment such as a cooling system and a pump and boosting equipment cost and running cost disadvantageously.

The upper limit of the temperature rise is preferably 8° C., particularly preferably 6° C. The lower limit of the temperature rise is preferably 2° C. to obtain a high-quality sheet, particularly preferably 3° C.

The diameter of the cooling roll is preferably in the range of 0.6 to 4.0 m.

When the diameter of the cooling roll is smaller than 0.6 m, its cooling capacity becomes insufficient whereby the grooves of the micro-cracks may be occluded quickly and it may be difficult to release the sheet from the cooling roll. When the diameter of the cooling roll is larger than 4.0 m, its cooling capacity is sufficient but the roll is too big, thereby making it difficult to surface finish the micro-cracks and increasing processing costs for that. The lower limit of the diameter of a practical cooling roll is preferably 0.8 m, particularly preferably 1.0 m. The upper limit of the diameter is preferably 3.5 m, particularly preferably 3.0 m.

The thickness of the shell having the grooves of a large number of micro-cracks of the cooling roll is preferably 5 to 30 mm.

When the thickness of the shell of the cooling roll is smaller than 5 mm, it is difficult to retain sufficiently the strength of the cooling roll and the flatness of the sheet is easily deteriorated by the deformation of the roll. When the thickness of the shell is larger than 30 mm, heat transmission from the cooling water deteriorates whereby the sheet may not be cooled enough. The lower limit of the thickness of the shell of the practical cooling roll is 7 mm, preferably 9 mm and the upper limit thereof is 25 mm, preferably 20 mm.

In the process of the present invention, the surface temperature (T, ° C.) of the molten polyester sheet 10 mm below the orifice-form nozzle is maintained at a temperature which satisfies the following expression (1):

$$(Tc+20)° C. \leq T \leq (Tm+40)° C. \tag{1}$$

wherein Tc and Tm are the falling temperature crystallization temperature (° C.) and melting point (° C.) of the polyester, respectively.

When the surface temperature of the sheet is higher than (Tm+40)° C., the effect of the present invention cannot be obtained and when the surface temperature is lower than (Tc+20)° C., a projection of the solidified polyester or the like is formed on the orifice at the end of the nozzle and contacted to the sheet extruded from the orifice, thereby forming a striped defect on the sheet and the fallen projection is adhered to the sheet to become a sheet defect. The upper limit of the surface temperature of the sheet is preferably (Tm+30)° C. to make the effect of the present invention more marked, particularly preferably (Tm+25)° C. The lower limit of the surface temperature of the sheet is preferably (Tc+25)° C. to achieve the excellent surface smoothness of the sheet, particularly preferably (Tc+30)° C.

By maintaining the surface temperature of the sheet at the range of the present invention, the low-molecular weight compound contained in the molten polyester is suppressed from diffusing from the interior to the surface of the sheet and the sublimation of the compound from the surface is further suppressed to control the accumulation speed of the compound on the surface of the cooling roll. Further, as not only the accumulation of the low-molecular weight compound on the surface of the cooling roll but also the accumulation of the compound in the inside of the groove of each micro-crack can be suppressed, time changes in the ventilation resistance of the groove of the micro-crack can be controlled, thereby making it possible to maintain the casting speed at a high level for a long time.

The surface temperature can be measured by a radiation type thermometer. The radiation type thermometer can selectively measure the surface temperature of a sheet product and does not provide disturbance to the sheet product because of non-contact measurement.

The melting point and falling temperature crystallization temperature of the polyester are measured by a differential scanning calorimeter (DSC). About 10 mg of a polyester sample is placed in an aluminum pan and heated at 300° C. for 5 minutes to be molten and the pan is placed on ice to be quenched so as to prepare a measurement sample. The temperature of this measurement sample is increased from 25° C. at a temperature elevation rate of 20° C./min to take its melting peak temperature as its melting point (Tm: ° C.). Meanwhile, about 10 mg of a polyester sample is placed in an aluminum pan and heated at 300° C. for 5 minutes to be molten and then the temperature is lowered at a rate of 10° C./min to take its crystallization peak temperature as its falling temperature crystallization temperature (Tc: ° C.).

To maintain the surface temperature of the sheet at the above range, a refrigerant such as air or oil is caused to run in the nozzle or the end of the nozzle to carry out heat exchange. In order to reduce the surface temperature of the sheet without causing temperature variations, the refrigerant is circulated by incorporating a pipe in parallel to the orifice in the width direction at the end of the nozzle, or the end of the nozzle is controlled by incorporating a heat pipe to eliminate temperature variations.

In the process of the present invention, the surface temperature of the cooling roll before it contacts the molten polyester sheet is maintained at a range of 5 to (Tg−20)° C. By maintaining the surface temperature of the cooling roll at a range of 5 to (Tg−20)° C., the molten polyester sheet maintained at the above surface temperature T is taken up and the adhesion and accumulation of the sublimate in the groove of each micro-crack of the cooling roll can be effectively prevented. The surface temperature of the roll is preferably in the range of 10 to (Tg−25)° C., more preferably 15 to (Tg−30)° C.

The polyester in the present invention is preferably an aromatic polyester comprising an aromatic dicarboxylic acid component and an aliphatic glycol component.

The aromatic polyester is preferably a polyester comprising terephthalic acid or 2,6-naphthalenedicarboxylic acid as the main aromatic dicarboxylic acid component.

The polyester comprising terephthalic acid as the main aromatic dicarboxylic acid component comprises terephthalic acid in an amount of preferably 50 mol % or more, particularly preferably 80 mol % or more based on the total of all the dicarboxylic acid components. Dicarboxylic acid components other than terephthalic acid include 2,6-naphthalenedicarboxylic acid, isophthalic acid, hexahydroterephthalic acid, 4,4'-diphenyldicarboxylic acid, adipic acid, sebacic acid and dodecanedicarboxylic acid. Examples of the aliphatic glycol component include ethylene glycol, diethylene glycol, propylene glycol, 1,3-propanediol, 1,4-butanediol, neopentyl glycol, 1,5-pentanediol, 1,6-hexanediol, cyclohexanedimethanol, polyethylene glycol and polytetramethylene glycol. Out of these, ethylene glycol, 1,3-propanediol and 1,4-butanediol are preferred and ethylene glycol is particularly preferred because the obtained polyester film has excellent mechanical properties and thermal properties.

The polyester comprising terephthalic acid as the main dicarboxylic acid component is, for example, polyethylene terephthalate. Polyethylene terephthalate may comprise a component other than terephthalic acid and ethylene glycol in an amount of 50 mol % or less, particularly 20 mol % or less.

The polyester comprising 2,6-naphthalenedicarboxylic acid as the main aromatic dicarboxylic acid comprises 2,6-naphthalenedicarboxylic acid in an amount of preferably 50 mol % or more, particularly preferably 80 mol % or more based on the total of all the dicarboxylic acid componet. Dicarboxylic acid components other than 2,6-naphthalenedicarboxylic acid include terephthalic acid, isophthalic acid, hexahydroterephthalic acid, 4,4'-diphenyldicarboxylic acid, adipic acid, sebacic acid and dodecanedicarboxylic acid. Examples of the aliphatic glycol component are the same as those listed above.

The polyester comprising 2,6-naphthalenedicarboxylic acid as the main dicarboxylic acid component is, for example, polyethylene-2,6-naphthalene dicarboxylate. Polyethylene-2,6-naphthalene dicarboxylate may comprise a component other than 2,6-naphthalenedicarboxylic acid and ethylene glycol in an amount of 50 mol % or less, particularly 20 mol % or less.

Polyethylene terephthalate may be mixed with 50 wt % or less of another polymer, for example, polyethylene-2,6-naphthalate.

Meanwhile, polyethylene-2,6-naphthalene dicarboxylate may be mixed with 50 wt % or less of another polymer, for example, polyethylene terephthalate.

To closely adhere the molten polyester sheet to the surface of the cooling roll in the process of the present invention, static electricity is applied to the molten polyester sheet to closely adhere the sheet to the cooling roll through the shift of charge, or the pressure of an atmosphere on the side in contact with the cooling roll of the molten polyester sheet is made lower than the pressure of an atmosphere on the opposite side to closely adhere the polyester sheet to the cooling roll.

When the former electrostatic adhesion method is employed out of these and the molten polyester sheet is a molten sheet of a polyester comprising terephthalic acid as the main acid component, it is desired that the resistivity of the sheet be $3\times10^6$ to $1\times10^8$ Ω.cm and that static electricity be applied to the molten polyester sheet to ensure that the amount of initial accumulated charge should be preferably 2.5 to 8.5 $\mu$C/mm$^2$, more preferably 3.0 to 8.0 $\mu$C/mm$^2$.

When the molten polyester sheet is a molten sheet of a polyester comprising 2,6-naphthalenedicarboxylic acid as the main acid component, it is desired that the resistivity of the sheet be $1\times10^7$ to $5\times10^8$ Ω.cm and that static electricity be applied to the molten polyester sheet to ensure that the amount of initial accumulated charge should be preferably 2.2 to 8.0 $\mu$C/mm$^2$, more preferably 2.5 to 7.5 $\mu$C/mm$^2$.

When the amount of initial accumulated charge is smaller than the above lower limit value, it is difficult to obtain a sheet at a high speed by the electrostatic adhesion method and when the amount is larger than the above upper limit value, large amounts of coarse particles and foreign matter are contained in the film or the thermal stability of the polymer becomes insufficient with the result that the film is readily colored yellow.

A polyester whose initial accumulated charge is in the range of the present invention in a molten state can be prepared by mixing at least one of an alkali metal, alkali earth metal, Mg, P or compound thereof with the above polyester. Out of these metal compounds, an Mg compound (for example, magnesium acetate) is preferably used, particularly preferably used in conjunction with a P compound.

The total amount of the metal compounds is preferably 20 to 2,000 ppm, more preferably 50 to 1,000 ppm, particularly preferably 100 to 600 ppm in terms of metal atoms contained in the polyester.

In the present invention, the molding speed of the polyester sheet is preferably 65 to 250 m/min in the case of a polyester comprising terephthalic acid as the main acid component and 40 to 200 m/min in the case of a polyester comprising 2,6-naphthalenedicarboxylic acid as the main acid component.

The thickness of the molded sheet in the present invention is preferably 5 to 400 $\mu$m.

According to the present invention, there is also provided a process for producing a biaxially oriented polyester film by biaxially orienting the polyester sheet obtained by the above process of the present invention in a longitudinal direction and a transverse direction. By this process, the transfer of the micro-cracks to the surface of the biaxially oriented film can be greatly suppressed.

The biaxial orientation in the present invention is sequential biaxial orientation that an unstretched sheet is preheated and stretched in a longitudinal direction and then in a transverse direction, or simultaneous biaxial orientation that an unstretched sheet is stretched in longitudinal and transverse directions simultaneously. Particularly in the case of sequential biaxial orientation, various known stretching methods, for example, a stretching method proposed by JP-A 54-8672 and JP-A 5-177702 may be advantageously employed. For example, an unstretched sheet is heated and stretched in a longitudinal direction repeatedly at multiple sections to a total draw ratio of 2 to 10 times and then in a transverse direction to a total draw ratio of 2 to 10 times during the step of stretching in the longitudinal direction at multiple sections and/or after the step of stretching in the longitudinal direction to achieve a total draw ratio in the both directions of 4 to 50 times, preferably 9 to 40 times, particularly preferably 12 to 30 times.

EXAMPLES

The following examples are given to further illustrate the present invention. The present invention is not limited to the following examples without departing from the scope of the invention. Characteristic property values were measured by the following methods.

"Part" in examples means "parts by weight". The longitudinal direction of the film means an extrusion direction in the production of a film and the transverse direction means a direction perpendicular to the longitudinal direction on the film plane.

(1) Melting Point of Polyester (Tm)

About 10 mg of a sample is enclosed in an aluminum pan for measurement. The aluminum pan enclosing the sample is set in a differential thermometer (V4. OB2000 DSC of DuPont Co., Ltd.), heated from 25° C. to 300° C. at a rate of 20° C./min, maintained at 300° C. for 5 minutes, taken out from the differential thermometer and placed on ice to be quenched immediately. This pan is then set in the differential thermometer again to take the melting peak temperature of the polyester which appears when the temperature is elevated from 25° C. at a rate of 20° C./min as the melting point (Tm: ° C.) of the polyester.

(2) Falling Temperature Crystallization Temperature (Tc) of Polyester

About 10 mg of a sample is enclosed in an aluminum pan for measurement. The aluminum pan enclosing the sample is set in a differential thermometer (V4. OB2000 DSC of DuPont Co., Ltd.), heated from 25° C. to 300° C. at a rate of 20° C./min, maintained at 300° C. for 5 minutes and cooled at a rate of 10° C./min to take the crystallization peak temperature generating while cooling as the falling temperature crystallization temperature (Tc: ° C.) of the polyester.

(3) Glass Transition Temperature (Tg) of Polyester

About 10 mg of a sample is enclosed in an aluminum pan for measurement. The aluminum pan enclosing the sample is set in a differential thermometer (V4. OB2000 DSC of DuPont Co., Ltd.), heated from 25° C. to 300° C. at a rate of 20° C./min, maintained at 300° C. for 5 minutes, taken out from the differential thermometer and placed on ice to be quenched immediately. This pan is then set in the differential thermometer again to measure the glass transition temperature (Tg: ° C.) of the polyester by elevating the temperature from 25° C. at a rate of 10° C./min.

(4) Surface Temperature (T) of Molten Polyester Sheet

The surface temperature of a center portion in a width direction of the molten polyester sheet 10 mm below the nozzle of an orifice is measured with a non-contact thermometer (IT2-60 handy thermometer equipped with a point marker of Keyence Co., Ltd.: emissitivity set value of 0.93). The side not in contact with the cooling roll of the molten polyester sheet is measured.

(5) Surface Temperature of Cooling Roll

The surface temperature of the cooling roll before the molten polyester sheet contacts the cooling roll is measured with a non-contact thermometer (TLR-1 roll temperature measuring instrument of Teijin Engineering Co., Ltd.). The emissitivity is set equal to the measurement value of a contact type thermometer. The measurement position of the surface temperature of the cooling roll is within a section between 50 mm and 200 mm away from a position before the molten polyester sheet contacts the cooling roll.

(6) Ventilation Resistance by Vacuum Leakage Method

The ventilation resistance in the present invention means a time required for a reduction in the degree of vacuum from a certain value to another certain value caused by an inflow of air through the grooves of the rough surface after a vacuum region with the certain degree of vacuum is formed in the rough surface (front surface of the cooling roll) by vacuum suction and vacuum suction is stopped.

Figure 2:
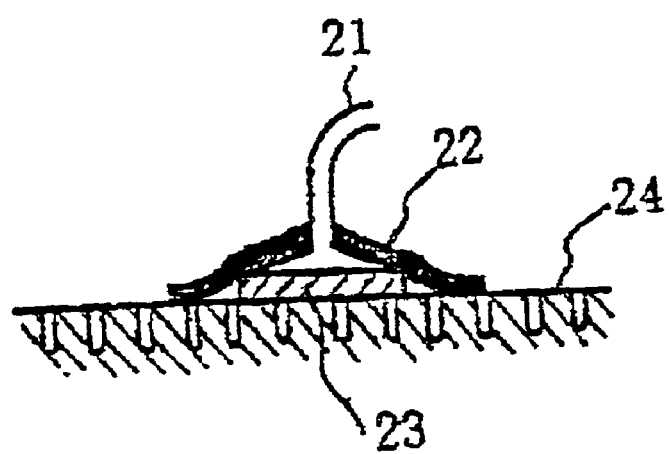
FIG. 2 is an enlarged sectional view of a sucker portion of the ventilation resistance measuring instrument of FIG. 1.

As for a specific method of measuring ventilation resistance, as shown in the schematic diagram of FIG. 1, a vacuum pump 14 is connected to one end of a vessel 11 equipped with a vacuum gauge 12 through a vacuum cock 13 and a rubber sucker 16 (for example, FPM. PFYK-40 of Myotoku Co., Ltd.) is attached to the other end by a vacuum hose 15. The effective volume from the vacuum cock 13 to the sucker 16 is 100 cc. As shown in the enlarged sectional view of the sucker portion of FIG. 2, a 40 mm-diameter sucker (16, 22) is pressed against the surface 24 of the cooling roll and a 30 mm-diameter porous sheet 23 (for example, 8-L-500 Naslon low-density sintered material of Nippon Seisen Co., Ltd.) is placed and pressed against the center of the sucker so that it contacts the outer surface of the sucker. When the inside of the 100 cc vessel is evacuated to −93.1 kPa (−700 mmHg) or less by the vacuum pump 14 and the cock 13 is closed, air flows into the vacuum system through the grooves of the rough surface surrounded by the sucker, resulting in a reduction in the degree of vacuum. The time required for a reduction in the degree of vacuum from −93.1 kPa to −86.45 kPa (−700 mmHg to −650 mmHg) is defined as ventilation resistance. Before the measurement of ventilation resistance, it is confirmed that the ventilation resistance of a polished glass plate is 20,000 sec or more to check the vacuum leakage of the measuring instrument.

As for the measurement of ventilation resistance, the ventilation resistance of the cooling roll is obtained by measuring 4 locations of a center portion in a width direction of the cooling roll at a pitch of 90° in a revolution direction and averaging the measurement values.

(7) Number of Intersecting Micro-Cracks

A 10 mm long scanning line is drawn on the surface of the cooling roll, observed through an optical microscope (RMP Roll Scope of Union Kogaku Co., Ltd.) at a magnification of X100 and photomicrographed. The total number of cracks intersecting the 10 mm long scanning line is obtained from the obtained photomicrograph.

(8) Average Opening Width of Micro-Cracks

A 10 mm long scanning line is drawn on the surface of the cooling roll, observed through an optical microscope (RMP Roll Scope of Union Kogaku Co., Ltd.) at a magnification of X500 and photomicrographed. The widths of all the cracks intersecting the 10 mm scanning line are obtained from the obtained photomicrograph and the average of the measurement values is taken as average opening width.

(9) Melt Viscosity of Polymer

The molten polymer is maintained in a measurement cylinder at 300° C. for 60 seconds by a Koka type flow tester (of Shimadzu Corporation) in accordance with JIS K7210 and discharged from a 10 mm-long and 1 mm-diameter nozzle under a load of 30 MPa to measure the melt viscosity (Pa.s) of the polymer.

(10) Resistivity of Molten Polymer

The resistivity of the molten polymer is measured in accordance with a method described in Brit. J. Appl. Phys. vol. 17, pp. 1149 to 1154, 1966. The melting temperature of the polymer is 290° C. when the polymer is a polyester comprising terephthalic acid as the main acid component and 295° C. when the polymer is a polyester comprising 2,6-naphthalenedicarboxylic acid as the main acid component, and the value of resistivity is measured right after a DC voltage of 1,000 V is applied.

(11) Amount of Initial Accumulated Charge

The amount of initial accumulated charge in a molten state is measured in accordance with a method disclosed by JP-A 62-189133. The melting temperature of the polymer is 275° C. when the polymer is a polyester comprising terephthalic acid as the main acid component and 295° C. when the polymer is a polyester comprising 2,6-naphthalenedicarboxylic acid as the main acid component, and the amount of initial accumulated charge is calculated from voltage and current values when a DC voltage of 1,200 V is applied for 3 minutes.

(12) Thickness of Sheet or Film 10 locations of a sheet or film are measured with a micrometer and the average of the measurement values is taken as the thickness of the sheet or film.

(13) Amount of Metal Compound

The amount (ppm) of a metal contained in a polymer is measured with fluorescent X-radiation (the 3270 fluorescent X-radiation of Rigaku Denki Kogyo Co., Ltd.).

Example 1-1

Polyethylene-2,6-naphthalene dicarboxylate (Tm: 270° C., Tc: 220° C.) was extruded from a T die having a nozzle end temperature of 255° C. into a 150 μm-thick molten polyester sheet which was then closely adhered to and cooled by a rotary cooling drum having a micro-cracked surface whose surface temperature was maintained at 35° C. by the electrostatic adhesion method to form a polyester sheet at a rate of 53 m/min. The surface temperature of the extruded sheet product about 10 mm below the nozzle was 262° C. The used cooling roll had an average micro-crack groove width on the surface of 2.3 μm and an average ventilation resistance before film formation of 380 sec, and the maximum casting speed at which a defect-free satisfactory sheet evaluated at the beginning of film formation could be obtained was 56 m/min.

The obtained polyester sheet was stretched to 3.9 times in a longitudinal direction and then 4.2 times in a transverse direction sequentially. Under the above conditions, biaxially oriented polyester films were formed for 6 days. On the fourth day after the start of film formation, film formation was suspended to remove the sublimate accumulated on the surface of the cooling roll (the surface of the roll was wiped with cloth impregnated with an aqueous solution containing a detergent and wrung hard) and then continued for another two days. Films could be formed smoothly without a trouble such as a break. The obtained biaxially oriented films were transparent and smooth high-quality films having no surface defect. When the cooling roll was evaluated after the end of film formation, there was no time change in the maximum casting speed (56 m/min) as compared with the beginning of film formation and the ventilation resistance remained almost unchanged at 383 sec.

Comparative Example 1-1

Film formation was carried out for 6 days by the same method under the same conditions as in Example 1-1 except that the nozzle end temperature was changed to 307° C., the surface temperature of the extruded sheet product was 312° C., and the frequency of the operation of removing the sublimate accumulated on the surface of the cooling roll was changed. Since the accumulation speed of the sublimate on the surface of the cooling roll was fast, the sublimate accumulated on the surface of the cooling roll had to be removed three times in the course of film formation in order to prevent the occurrence of an orange skin-like defect on the film. Since a trouble that the film was frequently broken in the step of stretching in a transverse direction occurred on the sixth day from the start of film formation, film formation was stopped. A time change in the maximum casting speed was observed as the maximum casting speed evaluated at the end of film formation was 52 m/min compared with the maximum casting speed (56 m/min) evaluated at the beginning of film formation. Deterioration in performance was seen because the average ventilation resistance at the end of film formation was 391 sec, compared with 380 sec before film formation. There was a portion having a low ventilation resistance of 436 sec.

Example 1-2

After the cooling roll used for 6 days of film formation in Comparative Example 1-1 was regenerated and cleaned, its average ventilation resistance and maximum casting speed were restored to initial values of 380 sec and 56 m/min at the beginning of film formation, respectively. Using this cooling roll, biaxially oriented polyester films were formed for 6 days under the same conditions as in Example 1-1. The same results as in Example 1-1 were obtained and no break trouble occurred.

Example 1-3

Biaxially oriented polyester films were formed for 6 days under the same conditions as in Example 1-2 using a cooling roll which was used to form films for 6 days in Example 1-2 and from which the sublimate accumulated on the surface was removed (the cooling roll was not regenerated and cleaned). The same results as in Example 1-2 were obtained.

Example 2-1

Polyethylene terephthalate (Tm: 260° C., Tg: 79° C., Tc: 160° C.) was extruded from a T die (nozzle having a width of 400 nm) having a nozzle end temperature of 260° C. into a 210 μm-thick polyester sheet which was then closely adhered to and cooled by a rotary cooling drum having a micro-cracked surface whose surface temperature was maintained at 30° C. by the electrostatic adhesion method to form a polyester sheet at a rate of 65 m/min. The surface temperature of the extruded sheet product about 10 mm below the nozzle was 265° C. Subsequently, this unstretched sheet was stretched to 3.6 times in a longitudinal direction and then 3.9 times in a transverse direction and heat set at 215° C. to obtain a biaxially oriented film.

The cooling roll had a micro-cracked surface with a ventilation resistance measured by the vacuum leakage method of 29 sec as average (the average number of cracks intersecting a 10 mm scanning line on the surface was 75 and the average opening width of all the cracks intersecting the 10 mm scanning line was 12 μm). During casting, the surface temperature of the cooling roll 100 mm at an upstream from the point where the sheet product landed (measured with the TLR-1 roll temperature measuring instrument) was 52° C.

A very slight micro-crack transferred pattern was observed on the obtained unstretched sheet but an orange skin-like defect was not observed on the biaxially oriented film. The surface smoothness of the film satisfied quality standards for a base material for video magnetic recording materials. The height of the mountain range of the transferred pattern of the unstretched sheet was about 0.06 μm but the height of the transferred pattern of the biaxially oriented film could not be detected with a detection accuracy of 0.02 μm.

Example 3-1

Polyethylene-2,6-naphthalene dicarboxylate (Tm: 270° C., Tg: 121° C.) having a melt viscosity of 1,200 Pa.s was molten and extruded from a 400 mm-wide nozzle into a 120 μm-thick sheet form which was then cast with a cooling roll at a rate of 55 m/min using the electrostatic adhesion method to obtain a similar unstretched sheet to that of Example 1-1 except that the following cooling roll was used. Subsequently, this unstretched sheet was stretched to 3.9 times in a longitudinal direction and then 4.1 times in a transverse direction and heat set at 225° C. to obtain a biaxially oriented film.

The cooling roll had a micro-cracked surface with an average ventilation resistance measured by the vacuum leakage method of 29 sec (the number of cracks intersecting a 10 mm scanning line on the surface was 75 and the average opening width of all the cracks intersecting the 10 mm scanning line was 12 μm). The surface temperature of the cooling roll 100 mm at an upstream from the point where the sheet product landed was 55° C. during casting (measured with the TLR-1 roll temperature measuring instrument).

A very slight micro-crack transferred pattern was seen on the obtained unstretched sheet but an orange skin-like defect was not seen on the biaxially oriented film and the surface smoothness of the film satisfied quality standards for a base material for video magnetic recording materials. The height of the mountain range of the transferred pattern of the unstretched sheet was about 0.05 μm but the height of the transferred pattern of the biaxially oriented film could not be detected with a detection accuracy of 0.01 μm.

Example 4-1

An unstretched sheet was obtained in the same manner as in Example 1-1 except that polyethylene-2,6-naphthalene dicarboxylate (Tg: 121° C., Tm: 270° C.) containing a magnesium compound (80 ppm), a phosphorus compound (30 ppm) and an antimony compound (250 ppm) and having a resistivity at the time of melting of $4 \times 10^7$ Ω.cm was molten in an extruder and extruded from a nozzle into a 180 μm-thick sheet form which was then closely adhered to a cooling roll having a micro-cracked surface described below by the electrostatic adhesion method to be solidified. The surface temperature of the cooling roll near the landing point of the molten sheet was 63° C. and the maximum sheet molding speed was 98 m/min. This unstretched sheet was wound up and then stretched to 3.6 times in a longitudinal direction and 3.9 times in a transverse direction.

The cooling roll used for casting had a micro-cracked surface, the average ventilation resistance on the surface measured by the vacuum leakage method thereof was 65 sec, the average number of cracks intersecting a 10 mm scanning line on the surface was 105, and the average opening width of all the cracks intersecting the 10 mm scanning line was 7 μm.

A very slight micro-crack transferred pattern was seen on the obtained molded sheet but an orange skin-like defect was not seen on the biaxially oriented film, there was no coarse foreign matter, and the surface smoothness of the film satisfied quality standards for a base material for video magnetic recording materials.

Example 5-1

An unstretched sheet was obtained in the same manner as in Example 2-1 except that polyethylene terephthalate (Tg: 79° C., Tm: 260° C.) containing a magnesium compound (90 ppm), a phosphorus compound (30 ppm) and an antimony compound (330 ppm) and having a resistivity at the time of melting of $7 \times 10^6$ Ω.cm was extruded from a nozzle into a 180 μm-thick sheet form which was then closely adhered to a cooling roll having a micro-cracked surface described below by the electrostatic adhesion method to be solidified. The surface temperature of the cooling roll near the landing point of the molten sheet was 48° C., and the maximum sheet molding speed was 130 m/min. This unstretched sheet was wound up, stretched to 3.6 times in a longitudinal direction and 3.9 times in a transverse direction, and heat set at 215° C.

The cooling roll used for casting had a micro-cracked surface, the average ventilation resistance on the surface measured by the vacuum leakage method thereof was 65 sec, the average number of cracks intersecting a 10 mm scanning line on the surface was 105, and the average opening width of all the cracks intersecting the 10 mm scanning line was 7 μm.

A very slight micro-crack transferred pattern was observed on the obtained molded sheet but an orange skin-like defect was not seen on the biaxially oriented film, there was no coarse foreign matter, and the surface smoothness of the film satisfied quality standards for a base material for video magnetic recording materials.

Example 6-1

The cooling roll used for casting had a micro-cracked surface, the average ventilation resistance on the surface measured by the vacuum leakage method thereof was 65 sec, the average number of cracks intersecting a 10 mm scanning line on the surface was 640, and the average opening width of all the cracks intersecting the 10 mm scanning line was 6 μm.

The tape-like discharge electrode was a stainless steel tape having a rectangular section, a thickness of 50 μm and a width of 8 mm and uniform in shape in a lengthwise direction, and a positive DC voltage of 6.7 kV was applied to the electrode.

An unstretched sheet was formed in the same manner as in Example 2-1 except that polyethylene terephthalate was extruded from a nozzle into a sheet form having a thickness of 180 μm and a width of 420 mm which was then electrostatically closely adhered to the above cooling roll having a micro-cracked surface by the above tape-like discharge electrode (installed at a position 2 mm away from the surface of the molten sheet in such a manner that the long axis of the section of the tape-like electrode became almost perpendicular to the surface of the cooling roll near the position where the molten sheet landed on the surface of the cooling roll) to be cast, and rolled up.

At a casting speed of 100 m/min, the allowable traveling width of the tape-like electrode for the stable production of a defect-free high-quality sheet was 1.5 mm in the circumferential direction of the cooling roll, was very stable and remained unchanged after the passage of 24 hours. The sheet had excellent surface smoothness without an orange skin-like defect. The sheet which was cast and rolled up was stretched to 3.6 times in a longitudinal direction and 3.9 times in a transverse direction and heat set at 215° C. An orange skin-like defect was not seen on the obtained biaxially oriented film and the surface smoothness of the film satisfied quality standards for a base material for high-grade video magnetic recording materials.

Example 7-1

The cooling roll used for casting had a micro-cracked surface, the average ventilation resistance on the surface measured by the vacuum leakage method thereof was 75 sec, the average number of cracks intersecting a 10 mm scanning line on the surface was 610, the average opening width of all the cracks intersecting the 10 mm scanning line was 4 μm, and the surface roughness (Ra) was 0.09 μm.

Polyethylene terephthalate was extruded from a nozzle into a 210 μm-thick sheet form which was then closely adhered to the above cooling roll having a micro-cracked surface to be cast. An unstretched sheet was formed in the same manner as in Example 2-1 except that a vacuum chamber was interposed between the die and the cooling roll to create a vacuum atmosphere near the surface in contact with the cooling roll of the extruded sheet by means of decreasing pressure in the chamber in order to closely adhere the extruded sheet to the cooling roll, and rolled up.

When the vacuum degree of the vacuum chamber was maintained at 1,400 Pa, the maximum speed at which a cooled sheet could be produced stably without generating air bubbles by the caught air was 78 m/min. This maximum speed was stable and remained unchanged after the passage of 24 hours. An orange skin-like defect was not observed on the sheet and the surface smoothness of the sheet was satisfactory. The rolled sheet was stretched to 3.6 times in a longitudinal direction and 3.9 times in a transverse direction and heat set at 215° C. An orange skin-like defect was not seen on the obtained biaxially oriented film and the surface smoothness of the film satisfied quality standards for a base material for high-grade video magnetic recording materials.

Comparative Example 7-1

Film formation was carried out using the same device and method as in Example 1-1 except that a cooling roll having a satin finished surface with a surface roughness (Ra) of 0.41 μm was used. As a result, the maximum casting speed was 56 m/min. An orange skin-like defect was observed on the obtained sheet. An orange skin-like defect was also seen on a biaxially oriented film obtained from this sheet and this film did not satisfy quality standards for a base material for high-grade video magnetic recording materials. This film was inferior in casting speed and film quality to a film formed by using a cooling roll having a micro-cracked surface.

Comparative Example 7-2

Film formation was carried out using the same device and method as in Example 1-1 except that a cooling roll having grinding streaks with a surface roughness (Ra) of 0.15 μm was used. As a result, the maximum casting speed was 44 m/min which was much lower than a cooling roll having a micro-cracked surface.

Air bubbles formed by the caught air became more marked along the passage of film formation time and the casting speed at which casting could be carried out stably without an air bubble defect was reduced to 41 m/min after 12 hours.

A conventional cooling roll having small roughness had a small speed increasing effect and experienced a great time change.

Example 8-1

An unstretched sheet was obtained in the same manner as in Example 2-1 except that polyethylene terephthalate was molten and extruded from a nozzle into a 250 μm-thick sheet form which was then cast with a cooling roll having a micro-cracked surface shown below using the electrostatic adhesion method. Subsequently, this unstretched sheet was stretched to 2 times at 110° C., 1.1 times at 120° C. and 3 times at 110° C. with a longitudinal-direction multi-stage stretching machine at a total draw ratio of 6.6 times. Then, the film was further stretched to 4.3 times in a transverse direction and heat set at 215° C. to obtain a biaxially oriented film. The total draw ratio in longitudinal and transverse directions was 28 times.

The cooling roll had a micro-cracked surface with an average ventilation resistance measured by the vacuum leakage method of 125 sec (the average number of cracks intersecting a 10 mm scanning line on the surface was 150 and the average opening width of all the cracks intersecting the 10 mm scanning line was 6 μm).

An orange skin-like defect was not observed on the obtained biaxially oriented film and the surface smoothness of the film satisfied quality standards for a base material for high-grade video magnetic recording materials.

Example 8-2

A biaxially oriented film was obtained in the same manner as in Example 1 except that a 190 μm-thick unstretched sheet was molded with the same casting device as in Example 8-1 and stretched to 2.2 times in a longitudinal direction at 100° C., 4 times in a transverse direction at 140° C. and then 2.3 times in a longitudinal direction again at 160° C. The total draw ratio in longitudinal and transverse directions was 20 times.

An orange skin-like defect was not seen on the obtained biaxially oriented film and the surface smoothness of the film satisfied quality standards for a base material for high-grade video magnetic recording materials.

Example 9-1

An unstretched sheet was obtained in the same manner as in Example 2-1 except that polyethylene terephthalate was molten and extruded from a nozzle into a 240 μm-thick sheet form which was then cast with a cooling roll having a micro-cracked surface shown below at a rate of 100 m/min using the electrostatic adhesion method. Subsequently, this unstretched sheet was stretched to 2.2 times at 110° C., 1.05 times at 120° C. and 4 times at 90° C. in a longitudinal direction with a longitudinal-direction multi-stage stretching machine and then 4.0 times in a transverse direction and heat set at 215° C. to obtain a biaxially oriented film. The total draw ratio in the longitudinal direction was 9.24 times and the wind-up speed was 924 m/min.

The cooling roll had a micro-cracked surface with an average ventilation resistance measured by the vacuum leakage method of 115 sec (the average number of cracks intersecting a 10 mm scanning line on the surface was 180 and the average opening width of all the cracks intersecting the 10 mm scanning line was 6 μm).

An orange skin-like defect was not seen on the obtained biaxially oriented film and the surface smoothness of the film satisfied quality standards for a base material for high-grade video magnetic recording materials.

Example 9-2

A biaxially oriented film was obtained in the same manner as in Example 1 except that a 220 μm-thick unstretched sheet was cast with the same casting device as in Example 9-1 at a rate of 120 m/min, stretched to 2.2 times in a longitudinal direction at 100° C., 3.6 times in a transverse direction at 140° C. and 2.7 times in the longitudinal direction again at 170° C., and wound up at a rate of 708 m/min. The total draw ratio in the longitudinal direction was 5.9 times.

An orange skin-like defect was not seen on the obtained biaxially oriented film and the surface smoothness of the film satisfied quality standards for a base material for high-grade video magnetic recording materials.

Example 10-1

An unstretched sheet was obtained in the same manner as in Example 2-1 except that polyethylene terephthalate (Tg: 79° C., Tm: 260° C.) containing a magnesium compound (100 ppm), a phosphorus compound (40 ppm) and an antimony compound (300 ppm) and having an initial accumulated charge at the time of melting of 5.9 $\mu$C/mm$^2$ was molten in an extruder and extruded from a nozzle into a 180 $\mu$m-thick sheet form which was then closely adhered to a cooling roll having a micro-cracked surface shown below using the electrostatic adhesion method to be solidified. The surface temperature of the cooling roll near the landing point of the molten sheet was 48° C. and the maximum sheet molding speed was 122 m/min. This unstretched sheet was wound up, stretched to 3.6 times in a longitudinal direction and 3.9 times in a transverse direction and heat set at 215° C.

The cooling roll used for casting had a micro-cracked surface, the average ventilation resistance on the surface measured by the vacuum leakage method thereof was 65 sec, the average number of cracks intersecting a 10 mm scanning line on the surface was 105, and the average opening width of all the cracks intersecting the 10 mm scanning line was 7 $\mu$m.

A very slight micro-crack transferred pattern was observed on the obtained molded sheet but an orange skin-like defect was not seen on the biaxially oriented film, there was no coarse foreign matter, and the surface smoothness of the film satisfied quality standards for a base material for video magnetic recording materials.

Example 11-1

An unstretched sheet was obtained in the same manner as in Example 1-1 except that polyethylene-2,6-naphthalate (Tg: 121° C., Tm: 270° C.) containing a magnesium compound (90 ppm), a phosphorus compound (40 ppm) and an antimony compound (280 ppm) and having an initial accumulated charge at the time of melting of 5.5 $\mu$C/mm$^2$ was molten in an extruder and extruded from a nozzle into a 160 $\mu$m-thick sheet form which was then closely adhered to a cooling roll having a micro-cracked surface shown below using the electrostatic adhesion method to be solidified. The surface temperature of the cooling roll near the landing point of the molten sheet was 63° C., and the maximum sheet molding speed was 88 m/min. This unstretched sheet was wound up, stretched to 3.6 times in a longitudinal direction and 3.9 times in a transverse direction and heat set at 225° C.

The cooling roll used for casting had a micro-cracked surface, the average ventilation resistance on the surface measured by the vacuum leakage method thereof was 70 sec, the average number of cracks intersecting a 10 mm scanning line on the surface was 105, and the average opening width of all the cracks intersecting the 10 mm scanning line was 7 $\mu$m.

A very slight micro-crack transferred pattern was observed on the obtained molded sheet but an orange skin-like defect was not seen on the biaxially oriented film, there was no coarse foreign matter, and the surface smoothness of the film satisfied quality standards for a base material for video magnetic recording materials.

Example 12-1

A polyester sheet was formed by extruding polyethylene terephthalate (Tm: 260° C., Tg: 79° C.) from a T die having a nozzle end temperature of 280° C. into a 200 $\mu$m-thick molten polyester sheet form, closely adhering the sheet to a rotary cooling drum having a micro-cracked surface whose surface temperature was maintained at 25° C. by the electrostatic adhesion method and gradually increasing the casting speed from 50 m/min while cooling the sheet. The surface temperature of the extruded sheet product about 10 mm below the nozzle was 280° C.

The total area Ac of the micro-cracked portion of the surface of the cooling roll used was 0.051 mm$^2$, 0.052 mm$^2$, 0.048 mm$^2$ and 0.049 mm$^2$ (average value was 0.050 mm$^2$) at four locations crossing one another at 90° in a circumferential direction of a center portion in a width direction of the roll based on 1 mm$^2$ of the surface in contact with the molten polyester sheet of the cooling roll. The cooling roll had a diameter of 2.0 m, a width of 1.0 m and a shell thickness of 15 mm. The maximum casting speed was 180 m/min and the obtained polyester sheet had no defect and was excellent. The temperature (Ti) of cooling water to be introduced into the inside of the cooling roll was 24° C., the temperature (To) of cooling water to be discharged to the outside of the cooling roll was 27° C., and the temperature difference of cooling water (To−Ti) was 3° C.

The obtained polyester sheet was then stretched to 3.4 times in a longitudinal direction and 4.0 times in a transverse direction sequentially. Biaxially oriented polyester films could be formed under the above conditions for 7 days. Film formation could be performed without a trouble such as a break during this period. The obtained biaxially oriented films were transparent and smooth high-quality films having no surface defect.

Examples 12–2 to 12-4 and Comparative Example 12-1

Polyester sheets and biaxially oriented polyester films were produced in the same manner as in Example 12-1 except that the type of the polyester used, the total area Ac of the micro-cracked portion of the surface of the cooling roll, the diameter of the cooling roll, the thickness of the shell of the cooling roll, the temperature (Ti) of cooling water to be introduced into the inside of the cooling roll, the temperature (To) of cooling water to be discharged to the outside of the cooling roll and the temperature difference (To−Ti) of cooling water were changed as shown in Table 1.

The maximum casting speed, the qualities of the obtained polyester sheets and the obtained biaxially oriented polyester films, the continuous film formation period and film formation conditions during the above period are shown in Table 1. In film formation using the mirror surface cooling roll of Comparative Example 12-1, the molding speed could not be increased due to the surface defect of the sheet.

In the column for the type of polyester in Table 1, PET stands for polyethylene terephthalate (Tm: 260° C., Tg: 79° C.) and PEN stands for polyethylene-2,6-naphthalene dicarboxylate (Tm: 270° C., Tg: 121° C.).

TABLE 1

| | | cooling roll | | | temperature of cooling water | | | | | |
|---|---|---|---|---|---|---|---|---|---|---|
| | type of polyester | total area of cracks (mm$^2$) | diameter (m) | shell thickness (mm) | input temperature (° C.) | output temperature (° C.) | temperature difference (° C.) | thickness of molded sheet (μm) | molding speed (m/min) | continuous operation time (day) |
| Ex. 12-1 | PET | 0.05 | 2.0 | 10 | 24 | 27 | 3 | 140 | 180 | 7 |
| Ex. 12-2 | PET | 0.20 | 0.8 | 7 | 24 | 27 | 3 | 30 | 120 | 10 |
| Ex. 12-3 | PET | 0.02 | 3.0 | 20 | 20 | 24 | 4 | 350 | 80 | 6 |
| Ex. 12-4 | PEN | 0.05 | 2.0 | 10 | 40 | 43 | 3 | 120 | 150 | 7 |
| C.Ex. 12-1 | PET | mirror surface | 2.0 | 10 | 24 | 26 | 2 | 140 | 60 | 8 |

Ex. = Example
C.Ex. = Comparative Example

What is claimed is:

1. A process for producing a polyester sheet by dropping a molten polyester sheet extruded from an orifice-form nozzle on a cooling roll having the grooves of a large number of micro-cracks formed on the surface, closely adhering it to the cooling roll and solidifying it on the cooling roll, wherein the surface temperature (T, ° C.) of the molten polyester sheet 10 mm below the orifice-form nozzle is maintained at a temperature which satisfies the following expression (1):

$$(Tc+20)° C. \leq T \leq (Tm+40)° C. \quad (1)$$

wherein Tc and Tm are the falling temperature crystallization temperature (° C.) and melting point (° C.) of the polyester, respectively and T is as defined hereinabove, and the surface temperature of the cooling roll when it contacts the molten polyester sheet is controlled to a range of 5 to (Tg−20)° C. to continuously form the polyester sheet while preventing the adhesion of a sublimate from the molten polyester to the inside of the groove of each micro-crack of the cooling roll.

2. The process of claim 1, wherein the cooling roll shows a ventilation resistance measured by a vacuum leakage method of 10,000 sec or less based on the grooves of the large number of micro-cracks formed on the surface of the cooling roll.

3. The process of claim 1, wherein the cooling roll has the grooves of at least five micro-cracks intersecting a 10 mm virtual straight line drawn in any direction on the surface of the cooling roll, 70% or more of the grooves of the intersecting micro-cracks have a width of 0.1 to 100 μm at intersections with the virtual straight line, and the total width of the grooves of the micro-cracks intersecting the virtual straight line at all the intersections is 5 mm or less.

4. The process of claim 1, wherein the total opening area of the grooves of the large number of micro-cracks open to the surface of the cooling roll is 0.01 to 0.3 mm$^2$ per 1 mm$^2$ of the surface of the cooling roll.

5. The process of claim 1, wherein the cooling roll cools the polyester sheet on the surface by introducing cooling water into the inside thereof and discharging it and a rise in the temperature of cooling water to be discharged from the temperature of cooling water to be introduced is controlled to 1 to 10° C.

6. The process of claim 1, wherein the diameter of the cooling roll is 0.6 to 4.0 m and the thickness of the shell having the grooves of the large number of micro-cracks on the surface of the cooling roll is 5 to 30 mm.

7. The process of claim 1, wherein the molten polyester sheet is closely adhered to the cooling roll through the shift of charge by applying static electricity to the molten polyester sheet.

8. The process of claim 7, wherein the molten polyester sheet is a molten sheet of a polyester comprising terephthalic acid as the main acid component and has a resistivity of $3 \times 10^6$ to $1 \times 10^8$ Ω·cm and static electricity is applied to the molten polyester sheet to ensure that the amount of initial accumulated charge should be 2.5 to 8.5 μC/mm$^2$.

9. The process of claim 8, wherein the polyester sheet is produced at a rate of 65 to 250 m/min.

10. The process of claim 7, wherein the molten polyester sheet is a molten sheet of a polyester comprising 2,6-naphthalenedicarboxylic acid as the main acid component and has a resistivity of $1 \times 10^7$ to $5 \times 10^8$ Ω·cm and static electricity is applied to the molten polyester sheet to ensure that the amount of initial accumulated charge should be 2.2×8.0 μC/mm$^2$.

11. The process of claim 10, wherein the polyester sheet is produced at a rate of 40 to 200 m/min.

12. The process of claim 1, wherein the molten polyester sheet is closely adhered to the cooling roll by making the pressure of an atmosphere on the side in contact with the cooling roll of the molten polyester sheet lower than the pressure of an atmosphere on the opposite side.

13. A process for producing a biaxially oriented polyester film, comprising biaxially orienting the polyester sheet obtained by the process of claim 1 in a longitudinal direction and a transverse direction.

14. The process of claim 13, wherein the product of a draw ratio in a longitudinal direction and a draw direction in a transverse direction is 4 to 50 times.

* * * * *